Jan. 3, 1928.
H. W. KRAMER
1,655,147
HANDLE FOR WOODEN BASKETS
Filed April 6, 1926
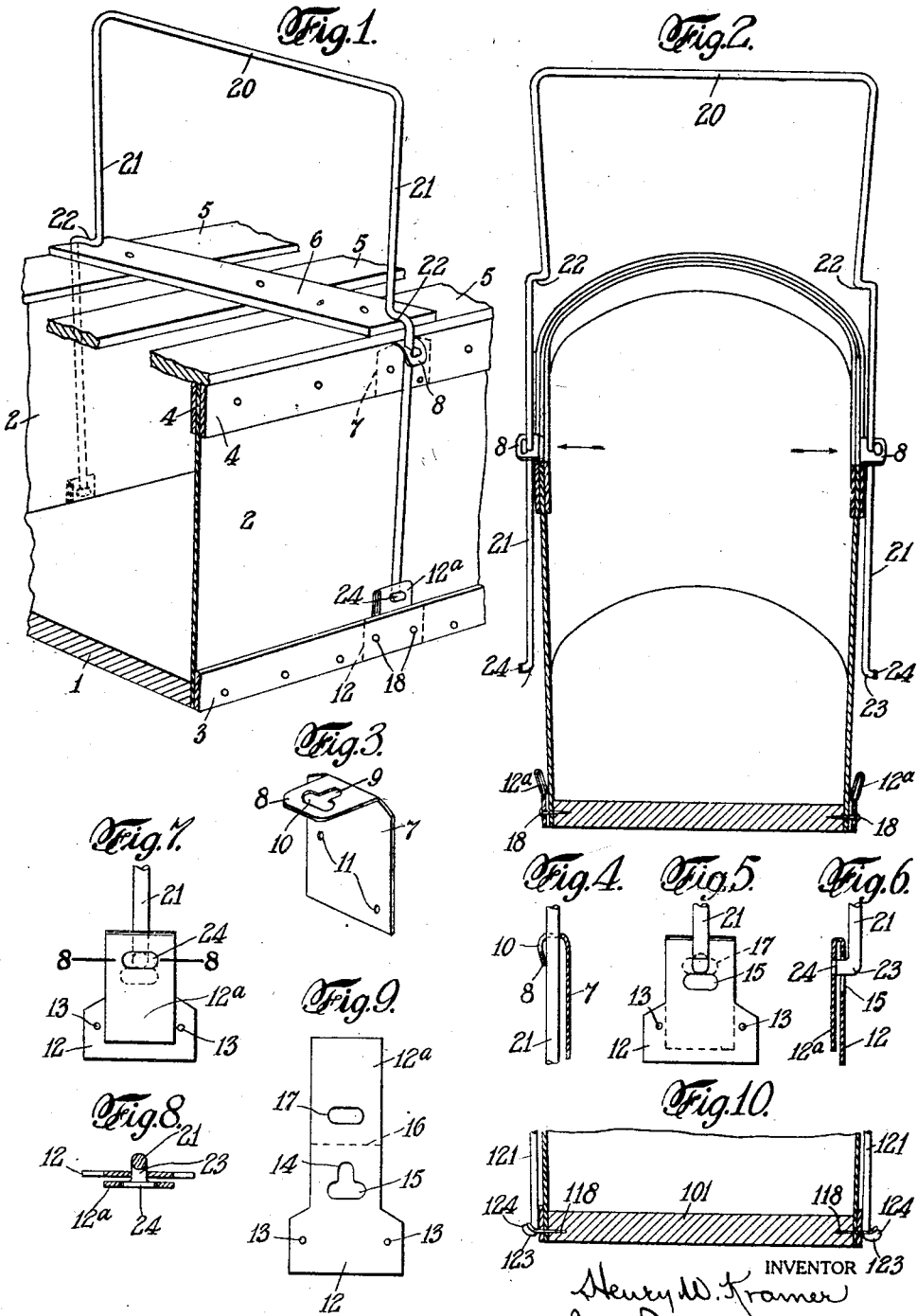
INVENTOR Henry W. Kramer
BY Louis Prevost Whitaker
ATTORNEY Patented Jan. 3, 1928.

1,655,147

UNITED STATES PATENT OFFICE.

HENRY W. KRAMER, OF KINGSTON, NEW YORK, ASSIGNOR TO RALPH P. YOUNG, OF MARLBORO, NEW YORK.

HANDLE FOR WOODEN BASKETS.

Application filed April 6, 1926. Serial No. 100,025.

My invention consists in the novel features hereinafter described, reference being had to the accompanying drawing which illustrates one form or embodiment of my invention, and a slight modification thereof, and the said invention is fully disclosed in the following description and claims.

The object of my invention is to provide a metallic handle for supporting and carrying a wooden basket of the type ordinarily used for holding and transporting grapes and other fruits, vegetables, etc. Such baskets are usually provided with handles formed of a thin strip of veneer secured to the sides of the basket at the time of manufacture, and these wooden handles are very much in the way in the packing of the baskets for shipment and in transporting them. They are frequently broken even before the baskets are used at all, and they also frequently break after the basket is filled, in such case often throwing the contents upon the ground with injury to the fruit and consequent material loss. In practice, these baskets are usually shipped from the factory to the farmer or fruit grower, who is to pack his products in them, and it is desirable to equip them with handles in such a manner that the baskets can be nested in considerable numbers, as say, 25 to a nest, and to provide them with handles which can be provided by the factory and shipped with them, so that they may be quickly and readily assembled on the baskets at the point of use, and if desirable in the field without the use of tools or apparatus.

In carrying out my present invention, I provide a unitary or one-piece handle of metal, preferably metal wire or rod which is so constructed as to co-operate with clips secured to the basket adjacent to the upper edge and adjacent to the bottom, and so constructed that the depending arms of the handle can be passed through the upper clips which serve as guides, to prevent the handle moving lengthwise with respect to the basket cover, the lower ends of said arms interlocking with the clips at the bottom of the basket, which are preferably connected through the sides to said bottom, so that the handle becomes rigidly connected with the basket and will support the weight of the contents from the bottom of the basket, usually a fairly heavy piece of wood, while the basket will be prevented from spreading at its upper edges, transversely of its central portion, and the basket may be held by means of the handle in any desired angular or other position without danger of its becoming accidentally detached from the basket. While it is possible to furnish the handle and clips to the user to be applied to the baskets at the point of use, this is not ordinarily desirable, and my invention permits the clips or handle retaining devices to be attached to the basket at the time it is constructed, so that the baskets may be nested for shipment, and the necessary handles for the baskets in each nest may be placed in the topmost basket or otherwise secured thereto, and applied at the points where the baskets are filled. I also prefer to so form the lateral portions of the handle that they provide cover retaining shoulders which will engage the cover and hold it in position on the basket when the handle is placed in operative relation with the basket.

In the accompanying drawings,

Fig. 1, is a perspective view of a portion of a wooden basket showing my improved handle in operative relation therewith, and holding the cover in position.

Fig. 2, is a view partly in perspective and partly in section, showing the basket and the handle as the latter is being placed in operative engagement with the basket.

Fig. 3, is a detail perspective view of one of the guiding clips to be attached to the upper edge of the basket.

Fig. 4, is a detail sectional view of one of these clips showing the outer end of its guiding flange bent downwardly into engagement with the handle, as it would appear after the handle is attached.

Fig. 5, is a back view of the locking clip which I prefer to employ adjacent to the bottom of the basket.

Fig. 6, is a sectional view of the same, showing the manner in which the locking end of the handle arm engages therewith.

Fig. 7, is a front elevation of one of these clips, showing the handle arm in engagement therewith.

Fig. 8, represents a section on line 8, 8, of Fig. 7.

Fig. 9, is a view of the blank of a locking clip before it is bent or folded.

Fig. 10, is a detail view of a portion of a basket showing the lower ends of the handle secured in place by staples instead of by the clips, as shown in the other figures.

In the accompanying drawings, I have shown in section, an ordinary wooden basket of the type referred to, which comprises ordinarily a solid bottom indicated at 1, and veneer sides indicated at 2, secured to the bottom by nails which pass through an exterior veneer bottom binding strip, 3, extending all the way around the basket, the sides, 2, being also provided around their upper edges with inner and outer veneer binding strips indicated at 4, 4, secured together with nails passing through the veneer sides. This is the ordinary construction, but the application of my invention is not limited strictly to it, as considerable variations may be made in the construction of the basket. These baskets are usually provided with a cover which in this instance comprises a series of strips or slats, 5, united by transverse strips, 6, one of which is conveniently located centrally of the length of the basket, or the cover may be of one piece, if preferred.

In Fig. 3, I have shown the preferred form of guiding clips, which I prefer to use at the upper edge of the basket. Each of these clips consists of an attaching plate, 7, which I prefer to slip between one of the upper binding strips, 4, and the veneer side, 2, midway of the length of the basket, and said plate is provided at its upper edge with an outwardly extending guiding flange, 8, having therein a T-shaped slot, providing a guiding portion, 9, adjacent to the upper edge of the attaching plate, 7, that is to say, close to the side of the basket, the outer portion of the slot having a wider portion indicated at 10, to permit the passage of an enlargement at the lower end of the handle arm, as hereinafter described. The attaching plate, 7, is provided with suitable apertures, 11, to permit the passage of nails therethrough, and while I prefer to attach this plate between one of the binding strips, 4, and the veneer sides, it may be attached to the outside of the binding strip, if preferred.

At the bottom of the basket on each side below the guiding clips just described, I provide the basket with locking clips, one of which is illustrated in Figs. 5 to 9, inclusive. This clip preferably consists of a plate illustrated in Fig. 9, having an attaching portion, 12, provided with apertures, 13, for the passage of a nail or tack therethrough, the remaining portion of the plate being preferably narrower, provided with a T-shaped slot having a narrow guiding and retaining portion. 14, and the wider portion, 15, adjacent to the attaching portion, 12. A portion of this narrow part of the plate indicated at 12ª, is adapted to be bent down over the other portion at a point indicated by the dotted line, 16, and this portion, 12ª, of the plate, is provided with a transverse slot, 17, so located that when it is bent downward over the portion, 12, of the plate, it will be in alignment with the narrow portion, 14, of the T-shaped slot, and out of alignment with the wider portion, 15, of the slot, as illustrated in Figs. 5, 6, and 7.

Each locking clip is attached to the basket preferably but not necessarily, by inserting it between the lower binding strip, 3, and the veneer side, 2, in the manner indicated in Figs. 1 and 2, and securing it in place by nails or screws which pass through the apertures, 13, and through the said strip and side and into the bottom of the basket, as indicated at 18, in Figs. 1 and 2. The clip may, however, be attached on the outside of the binding strip, if desired, and in any case, it will be understood that there is a slight space between the portion, 12ª, and the portion, 12, of the clip, as indicated for example in the sectional view, Figs. 6 and 8. The flexibility of the side strips, 3 and 4, will easily accommodate the metal clips which may be made of thin metal and still possess the requisite strength.

The handle proper is in the form of a bail having the transverse hand engaging portion, 20, and downwardly extending side arms, 21, each of which is provided with a cover engaging shoulder indicated at 22, and preferably formed by bending the material of the handle, which is conveniently made of round iron or steel wire, or rod, although it could be made of other suitable material, and in any desired cross section. The lower end of each of the arms, 21, is provided with an outwardly bent portion, 23, provided at its outer extremity with a T-shaped horizontal portion or head, indicated at 24 (see Fig. 8). The bend, 23, and the head, 24, of the handle arm, correspond to the shape of the portions, 9 and 10, of the slot in the guiding clip, so that when the flange, 8, thereof, is in horizontal position, the lower end of a handle arm, 21, may be passed readily through the T-shaped slot, 9 and 10, as indicated in Fig. 2, the head, 24, passing through the wider portion, 10, of the slot, and the arm itself engaging the narrower portion, 9, of said slot. The lower ends of the handle arms, 21, are adapted to interlock with the locking clips at the bottom of the basket in such manner, that when once engaged therewith, they cannot be accidentally disengaged therefrom.. In applying the handle to the basket, the arms, 21, are passed down through the retaining clips, as just described, until the T-shaped head, 24, is brought opposite to the wider portion, 15, of the slot in the portion, 12, of the locking clip which lies below the narrower retaining portion, 14, when the parts are in operative position, as shown in Figs. 5, 6, and 7. The handle is then drawn upward to bring the portion, 23, into engagement with the narrower retaining portion, 14, of the slot in the locking clip. As the T-shaped head, 24, is drawn upward between the portions, 12 and 12ª, of the plate, it slightly springs these portions apart until the T-shaped head, 24, or enlarged portion of the handle arm arrives at a position which coincides with the transverse slot, 17, in the part, 12ª, of the clip, whereupon the T-shaped head, 24, snaps into the slot, 17, and permits the plate portions, 12 and 12ª, to resume their normal relations. This leaves the parts in the position indicated in Figs. 5, 6, 7, and 8, and it will be impossible for the lower ends of the handle arms to become accidentally disengaged from the locking clips. They may be disengaged intentionally if this should become desirable, by reversing the operation by which they were engaged, but this cannot happen by inadvertence, and the handle will therefore remain rigidly attached to the basket when once applied. It will be seen that the outward pressure of the contents of the basket, which will be exerted in the direction of the arrows in Fig. 2, would tend to keep the handle arm, 21, in engagement with the narrow or retaining portions, 9, of the slots in the guiding clips, and it will also be seen that the handle arms will tend to reinforce the basket centrally, and prevent the sides from spreading. In order to make the connection between the upper edge of the basket and the handle arms even more rigid, and to prevent the possibility of any movement of the handle longitudinally of the basket, I prefer to bend down the outer end of each of the flanges, 8, of the guiding clips in the manner illustrated in Figs. 1 and 4, so that the outer ends of said flanges bear against the outer side or face of the handle arm and positively hold it against the possibility of disengaging itself from the guiding portion, 9, of the slot in the flange 8. These flanges 8, can be bent down by the fingers if the ductility of the metal permits, or they may be bent down by the use of a pair of pinchers, or by the blow of a hammer, or other article. It is not necessary to so bend them down, but it may be done if desired, and will prevent the outer edges of the flanges, 8, from catching in anything.

It will be seen that the clips can be attached to the baskets at the time the baskets are made, at the factory and that they will not interfere with the nesting of the baskets for shipment. As before stated, the necessary number of handles for the baskets of a nest can be packed in the topmost basket. The handle can be quickly applied to the clips when it is desired to fill the basket, and when once applied the handle is rigidly held with respect to the basket, so that the basket can be held at any angle while it is being filled without disengaging the handle. The lateral arms of the handle proper being firmly attached to the basket adjacent to the bottom and adjacent to the top, will stiffen the structure of the basket centrally of its length and prevent the upper edges from being forced outwardly by the contents. As the lower clips are directly secured to the bottom of the basket, when the hand engaging portion, 20, is seized, the entire weight of the contents is lifted from the bottom of the basket and supported by the said bottom, so that the weight of the contents of the basket will have no tendency to injure the basket or cause a separation of its component parts. It will be understood, that if it is desired to do so, the handle proper and attaching and guiding clips can be furnished separately from the baskets, and the clips can be applied thereto after the baskets have been completed, either at the factory or at the point of use, in which case the clips may be applied to the exterior of the top and bottom binding strips, 3, 4, instead of between the strips and veneer sides of the basket, which is my preferred arrangement.

In some instances the lower clips may be dispensed with, and the T-shaped projection, 23, 24, at the lower end of the handle arm can be attached to the basket and the bottom thereof by staples driven through the lower binding strip, the basket side, and into the bottom, as indicated at 118, in Fig. 10, in which the parts are given the same numbers as the other figures with the addition of 100. It will also be seen that when the lower ends of the handle proper are properly secured to the bottom of the basket, the shoulders, 22, of the handle will be in such position with respect to the upper edge of the basket, as to extend inwardly over and engage the top of the basket and hold it in closed relation with respect to the basket. In the present instance, in which I have shown in Fig. 1, a basket cover or lid formed of slats with a central cross-bar or cleat 6, the shoulders, 22, will engage such cleat, but where the basket top is formed of one thickness of wood or a flat piece of wood, these shoulders would be so constructed as to engage the upper surface thereof.

What I claim and desire to secure by Letters Patent is:—

1. A handle for wooden baskets comprising a metallic handle proper, having downwardly extending arms provided adjacent to their lower ends with rigid retaining devices, having portions projecting laterally out of alignment with said arms, guiding devices provided with means for attaching them to the sides of the basket adjacent to the upper edges thereof, and having guiding apertures of greater area than the cross sectional area of said arms, to permit the passage of said retaining devices therethrough, and retaining devices separate from said arms provided with means for permanently attaching them to the opposite sides of the basket adjacent to the bottom thereof, and provided with means for detachably interlocking with the said rigid retaining devices on said handle arms.

2. A handle for wooden baskets comprising among its members a handle proper provided with downwardly extending arms, having rigid retaining devices at their lower end provided with laterally extending portions, guiding devices provided with means for permanently attaching them to the sides of the basket adjacent to the upper edge thereof, and having apertures therein of sufficient size to permit the passage of the retaining portions of the handle arms therethrough, said apertures being provided with narrower guiding recesses for engaging portions of said arms above the retaining devices thereof, and retaining devices separate from said arms, provided with means for permanently attaching them to the basket adjacent to the bottom thereof, and provided with means for effecting a detachable interlocking engagement with said rigid retaining devices.

3. A handle for wooden baskets comprising among its members, a handle proper provided with a horizontally disposed hand engaging member and downwardly extending arms, provided adjacent to their lower ends with outwardly extending portions provided with enlarged terminal portions, guiding devices consisting each of a part adapted to be attached to the side of the basket adjacent to its upper edge and provided with a laterally extending portion, having an aperture therein of sufficient size to permit the passage of the lower end of a handle arm therethrough, and having at its inner edge a narrower guiding portion to engage and fit the handle arm to prevent the lateral movement thereof in a direction longitudinally of the basket, and retaining devices each consisting of a part adapted to be attached to the basket adjacent to the bottom thereof, and provided with locking apertures to engage said outwardly extending and enlarged terminal portion of a handle arm and prevent the accidental disengagement of the handle therefrom.

4. A handle for wooden baskets comprising among its members, a handle proper provided with a horizontally disposed hand engaging member and downwardly extending arms, provided adjacent to their lower ends with outwardly extending portions provided with enlarged terminal portions, guiding devices consisting each of a part adapted to be attached to the side of the basket adjacent to its upper edge and provided with a laterally extending portion, having an aperture therein of sufficient size to permit the passage of the lower end of a handle arm therethrough, and having at its inner edge a narrower guiding portion to engage and fit the handle arm to prevent the lateral movement thereof in a direction longitudinally of the basket, and retaining devices each consisting of a part adapted to be attached to the basket adjacent to the bottom thereof, and provided with locking apertures to engage said outwardly extending and enlarged terminal portion of a handle arm and prevent the accidental disengagement of the handle therefrom, the laterally projecting portions of said guiding devices being formed of thin sheet metal and constructed so that when bent downwardly into engagement with the outer side of the handle arm, they will hold it in engagement with the guiding portion of said aperture therein.

5. A handle for wooden baskets comprising among its members, a handle proper provided with a horizontally disposed hand engaging member and downwardly extending arms, provided adjacent to their lower ends with outwardly extending enlarged locking portions, guiding devices provided with means for attaching them to the opposite sides of the basket, and guiding portions for engaging the handle arms and locking clips secured to the basket adjacent to the bottom thereof, formed of sheet metal and comprising an attaching portion adapted to be secured to the basket, and a locking portion provided with an aperture therein of sufficient size to permit the passage of said enlarged terminal portion of a handle arm therethrough, and an upwardly extending narrower locking portion of less size than said terminal portion to prevent the accidental disengagement of the said terminal portion therefrom.

6. A handle for wooden baskets comprising among its members, a handle proper provided with a horizontally disposed hand engaging member and downwardly extending arms, provided adjacent to their lower ends with outwardly extending enlarged locking portions, guiding devices provided with means for attaching them to the opposite sides of the basket, and guiding portions for engaging the handle arms and locking clips secured to the basket adjacent to the bottom thereof, formed of sheet metal and comprising an attached portion adapted to be secured to the basket, and a locking portion provided with an aperture therein of sufficient size to permit the passage of said enlarged terminal portion of a handle arm therethrough, and an upwardly extending narrower locking portion of less size than said terminal portion to prevent the accidental disengagement of the said terminal portion therefrom, said clip having a substantially parallel flexible plate portion with a locking aperture for engaging said enlarged terminal portion, located in horizontal alignment with a narrower locking portion of said first mentioned aperture.

7. A handle for wooden baskets comprising among its members, a handle proper provided with a hand engaging member and downwardly extending arms, adapted to extend to the bottom of the basket, said arms being provided at their lower ends with outwardly extending portions terminating in an enlarged locking portion, a pair of guiding clips comprising each a plate member adapted to be secured to the basket adjacent to its upper edge, and a horizontally disposed flange member provided with an aperture having guiding portions fitting the handle arm, the outer portions of said aperture being enlarged to permit the vertical passage of the lower ends of the handle arm therethrough, and a pair of locking clips each provided with means for attaching it to the side and bottom of the basket, and having vertically disposed parallel plate members including an inner plate member, provided with a locking aperture having a lower portion of sufficient size to permit the passage of the enlarged terminal of a handle arm therethrough, and a narrower locking portion extending vertically therefrom to receive the outwardly bent portion of said arm adjacent to said terminal, and an exterior resilient plate member provided with a locking aperture adapted to receive the enlarged terminal portion of a handle arm, located in horizontal alignment with the locking portion of the aperture in the other plate member to hold the lower end of a handle arm against accidental disengagement from the locking clip.

8. A handle for wooden baskets comprising among its members, a handle proper provided with a hand engaging member and downwardly extending arms, adapted to extend to the bottom of the basket, and each provided at its lower end with an outwardly bent horizontal arm provided with a horizontal locking terminal, a pair of guiding clips each comprising a vertical plate portion adapted to be attached to the side of the basket adjacent to the upper edge thereof, and a horizontally disposed flexible flange portion provided with a T-shaped aperture, the narrower portion of which is adjacent to the basket, said aperture permitting the vertical passage of the lower end of the handle arm therethrough, and the guiding portion of said aperture fitting a handle arm so as to hold it against movement longitudinally of the basket, and a pair of locking clips each comprising a vertically disposed plate member adapted to be secured to the side and bottom of the basket, and provided with an inverted T-shaped aperture provided with a horizontal portion to permit the passage of the locking terminal of a handle arm therethrough, and a vertical locking portion to engage the outwardly bent arm of the handle arm adjacent thereto, said plate member being provided with a resilient locking plate member formed integrally therewith, and bent over downwardly parallel and closely adjacent thereto, and provided with a horizontal locking aperture in position to engage the locking terminal of a handle arm when its adjacent horizontal arm is in engagement with the locking portion of the aperture in the other plate member, to prevent the accidental disengagement of the handle arm from the locking clip.

In testimony whereof I affix my signature.

HENRY W. KRAMER.